H. E. HEATON.
SPRING WHEEL.
APPLICATION FILED MAY 7, 1907.
899,668.
Patented Sept. 29, 1908.
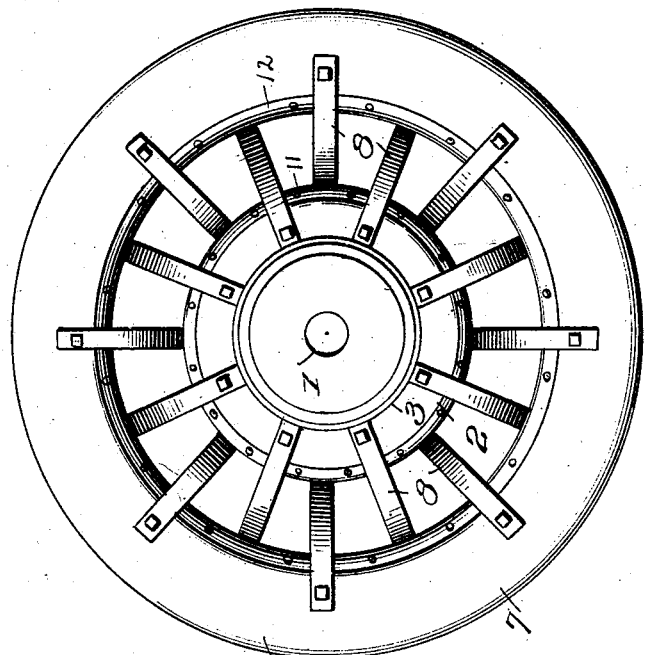
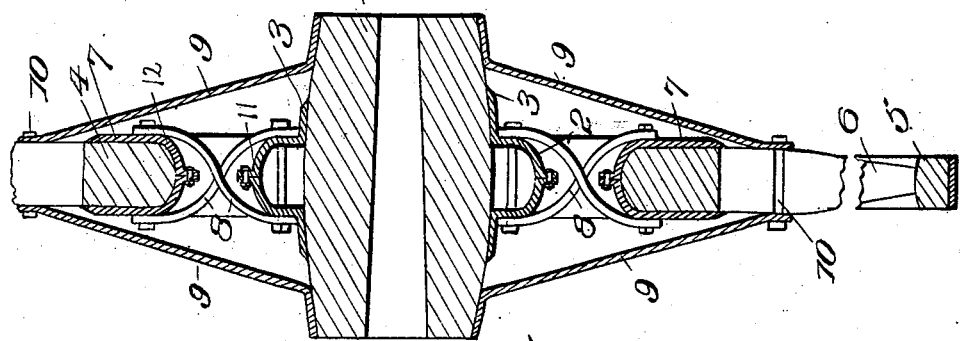

UNITED STATES PATENT OFFICE.

HENRY E. HEATON, OF OROVILLE, CALIFORNIA.

SPRING-WHEEL.

No. 899,668.  Specification of Letters Patent.  Patented Sept. 29, 1908.

Application filed May 7, 1907. Serial No. 372,351.

*To all whom it may concern:*

Be it known that I, HENRY E. HEATON, a citizen of the United States, residing at Oroville, in the county of Butte and State of California, have invented certain new and useful Improvements in Spring-Wheels, of which the following is a specification.

The present invention relates to certain new and useful improvements in spring wheels and consists essentially of a hub portion formed with an outstanding annular rib, and a wheel portion comprising an inner rim spaced from the before mentioned rib and connected thereto by means of alternately arranged spring strips having their end portions secured to the inner rim of the wheel section and the annular rib of the hub section upon opposite sides of the wheel, the end portions of the springs lying in approximately parallel planes while their intermediate portions are reversely curved.

The object of the invention is to design a wheel of this character which is simple and durable in its construction and operates in an efficient manner to prevent all jars and shocks applied to the wheel from being transmitted to the axle and body of the vehicle.

For a full description of the invention and the merits thereof and also to acquire a knowledge of the details of construction and the means for effecting the result, reference is to be had to the following description and accompanying drawings, in which:

Figure 1 is a vertical sectional view through a spring wheel constructed in accordance with the present invention. Fig. 2 is a side elevation, portions of the wheel being removed.

Corresponding and like parts are referred to in the following description and indicated in all the views of the drawings by the same reference characters.

Specifically describing the invention the numeral 1 designates the hub which may be of any approved construction and is provided with the outsanding annular rib 2. In the preferred form of the invention this rib 2 has a hollow formation and is formed from two suitably bent strips of sheet material, the inner edges thereof being extended radially and riveted at 11 while the outer edge portions thereof are extended laterally in opposite directions to form the flanges 3 which are secured to the hub. The body portion of the wheel comprises the inner rim 4 and the outer concentric rim 5 connected by the spokes 6. The inner rim 4 is reinforced and protected by means of a sheet metal casing 7 applied thereto, the said casing being approximately U-shape in cross section and the two arms thereof fitting against opposite sides of the rim. This casing 7 is preferably formed of two strips of sheet material which are riveted together at 12.

In order to bring about a resilient connection between the inner rim 4 of the body portion of the wheel and the outstanding rib 2 on the hub spring members 8 are employed. In the present instance these spring members are in the nature of alternately arranged spring strips, each strip having one end thereof secured to the rim 4 on one side of the wheel while the other end is secured to the rib 2 on the opposite side of the wheel, the two end portions of the strip lying in approximately parallel planes while the intermediate portion of the strip is reversely curved. With this construction all sharp bends in the spring members are avoided and at the same time the said members are so disposed as to permit relative movement of the hub and body portion of the wheel, thereby tending to absorb all sudden shocks and jars and prevent the same from being transmitted to the axle and body of the vehicle. In order to protect the springs 8 from dust and rain guard members 9 may be utilized which as shown on the drawing are in the nature of plates applied to opposite sides of the wheel, the central portion of the plates being secured to the end portion of the hub while the outer portions are inclined inwardly and have their peripheries connected by bolts 10 passing loosely between the spokes 6. It will thus be apparent that the guard plates 9 do not have any direct connection with the body portion of the wheel and do not therefore interfere with the free action of the spring members 8.

Having thus described the invention, what is claimed as new is:

In a spring wheel, the combination of a hub, a hollow annular rib upon the hub and formed of sheet material having the edges thereof extended outwardly to form flanges which are secured to the hub, a body portion comprising an inner rim, a reinforcing casing of U cross section applied to the inner rim, and spring strips connecting the inner rim of the body portion of the wheel to the annular rib of the hub, alternate strips being arranged in a reverse manner and each of the spring strips having one of their ends secured to the rim upon one side of the wheel while the opposite end is secured to the rib on the other side of the wheel, the end portions of the spring lying in approximately parallel planes while the intermediate portion is reversely curved.

In testimony whereof I affix my signature in presence of two witnesses.

HENRY E. HEATON. [L. S.]

Witnesses:
  DAVID DANIELS,
  WILLIAM W. TOLAND.